(12) United States Patent
Johnson et al.

(10) Patent No.: US 6,753,471 B2
(45) Date of Patent: Jun. 22, 2004

(54) OUTLET BOX ASSEMBLY

(75) Inventors: Steven J. Johnson, Galien, MI (US);
Robert W. Jorgensen, Niles, MI (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 10/346,183

(22) Filed: Jan. 17, 2003

(65) Prior Publication Data

US 2003/0137816 A1 Jul. 24, 2003

Related U.S. Application Data

(60) Provisional application No. 60/349,336, filed on Jan. 22, 2002.

(51) Int. Cl.[7] ................................................. H02G 3/08
(52) U.S. Cl. .............................. 174/50; 174/57; 174/58; 220/4.02; 248/900; 439/535
(58) Field of Search .............................. 174/50, 57, 58, 174/17 R; 220/3.6, 3.8, 4.02; 248/906; 439/535

(56) References Cited

U.S. PATENT DOCUMENTS

| | | |
|---|---|---|
| 1,991,160 A | 2/1935 | Knight |
| 2,285,883 A | 6/1942 | Anderson |
| 3,012,090 A | 12/1961 | Robbins |
| 3,098,114 A | 7/1963 | Hawn et al. |
| 3,288,910 A | 11/1966 | Zerwes |
| 3,565,276 A | 2/1971 | O'Brien |
| 3,975,074 A | 8/1976 | Fuller |
| 4,063,110 A | 12/1977 | Glick |
| 4,546,418 A | 10/1985 | Baggio et al. |
| 4,634,015 A | * 1/1987 | Taylor ........................ 220/3.7 |
| 5,228,584 A | 7/1993 | Williams, Jr. |
| 5,258,656 A | 11/1993 | Pawlick |
| 5,773,760 A | 6/1998 | Stark et al. |

* cited by examiner

*Primary Examiner*—Dhiru R Patel
(74) *Attorney, Agent, or Firm*—Garrett V. Davis; Alfred N. Goodman

(57) ABSTRACT

An electrical assembly containing one or more electrical devices is provided for mounting on a wall or other support. The assembly includes a housing having a rear wall and a front wall. The front wall is typically a faceplate with openings exposing the electrical devices. A cover is pivotally connected to the housing to enclose the front wall and protect the electrical devices. The rear wall includes a removable panel which can be removed to form an opening. An adapter which functions as a mounting device has a column with an axial passage where the mounting device is coupled to an electrical box. The column is inserted through the opening in the rear wall of the housing for mounting the assembly on the electrical box. In one embodiment, the housing includes a sleeve dimensioned to receive the column of the adapter.

40 Claims, 13 Drawing Sheets

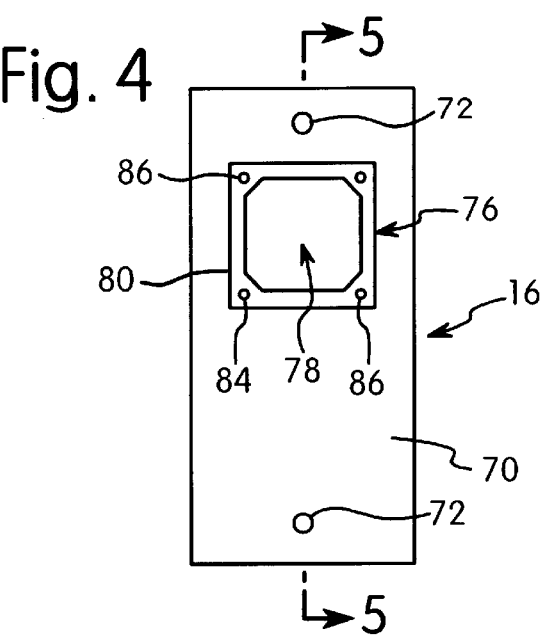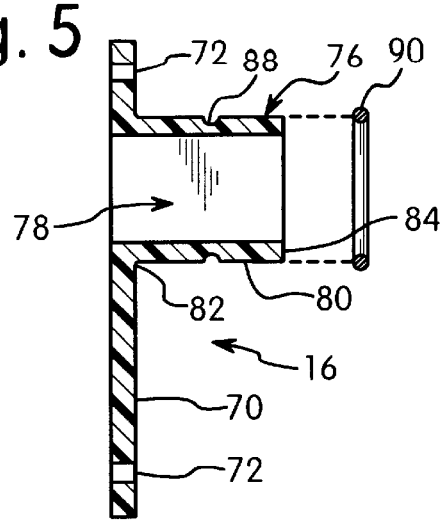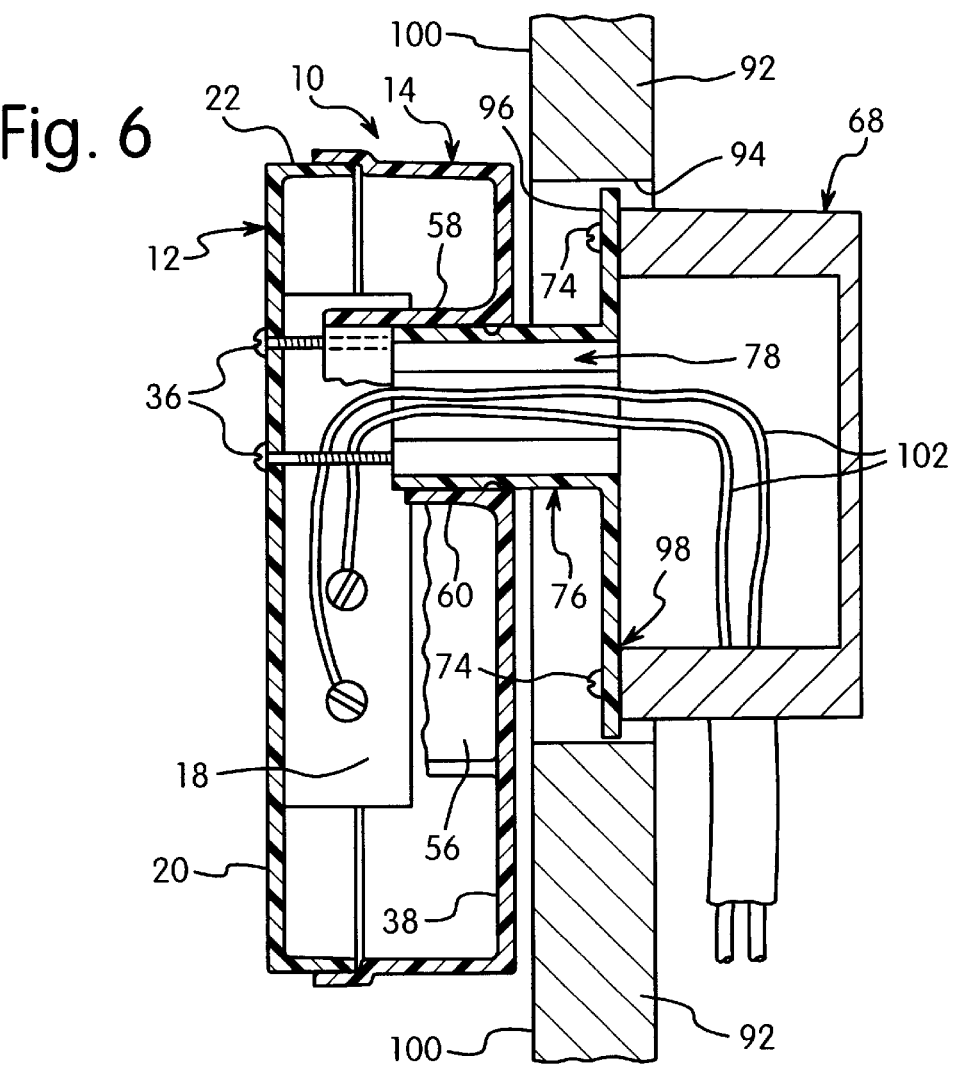

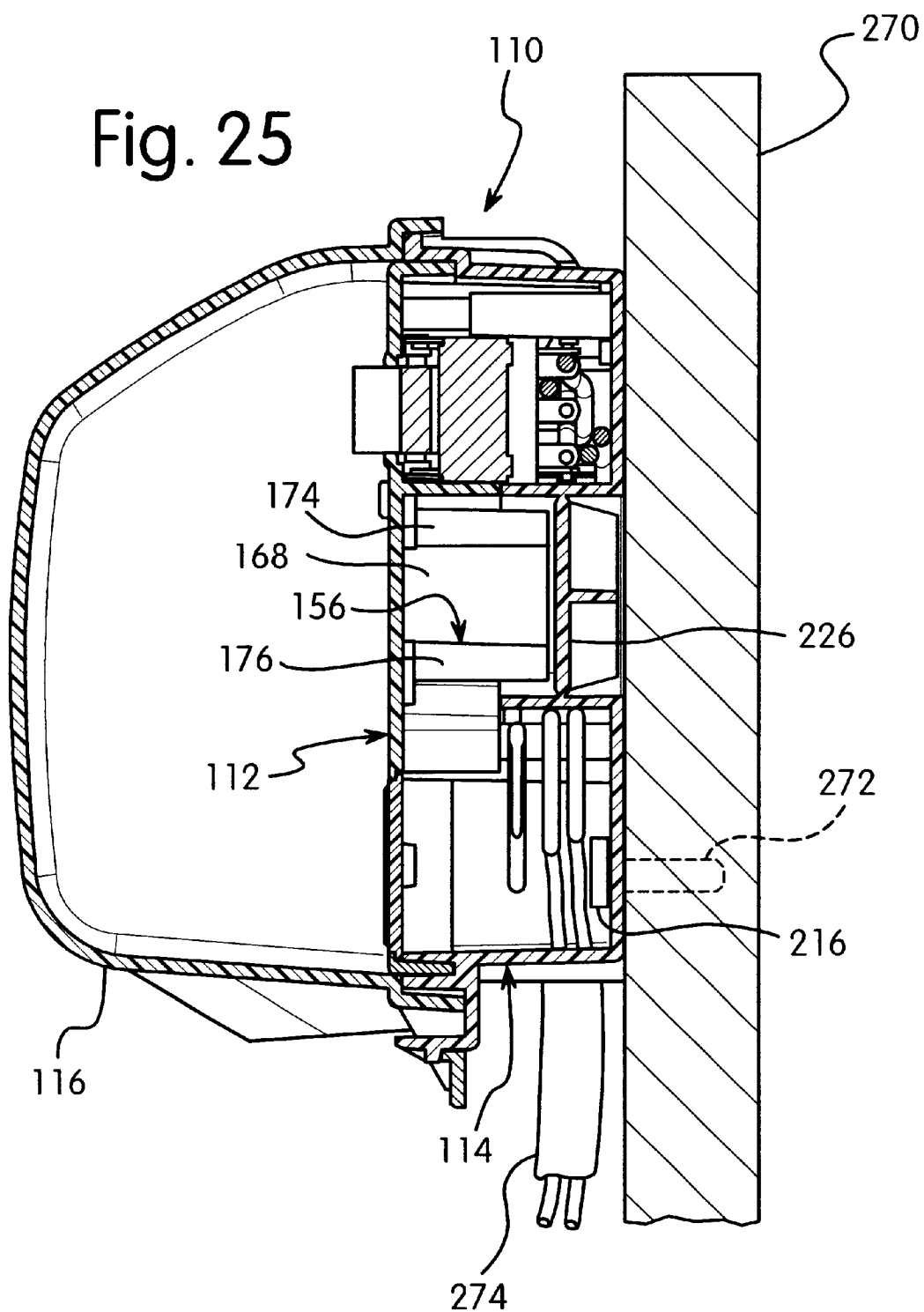

OUTLET BOX ASSEMBLY

This application claims the benefit under 35 U.S.C. §119(e) of U.S. Provisional Application No. 60/349,336, filed Jan. 22, 2002, which application is hereby incorporated by reference in its entirety.

FIELD OF THE INVENTION

The present invention is directed to an electrical assembly, and particularly to a mounting device for an outdoor outlet assembly. The invention is also directed to an outlet box assembly that can be mounted and connected directly to an electrical box.

BACKGROUND OF THE INVENTION

Electrical boxes for outdoor use are well-known in the industry to provide a convenient power source. Many electrical boxes contain a weatherproof cover or enclosure to prevent dust, water and other materials from entering the electrical receptacle. An example of one type of weatherproof electrical enclosure having a hinged cover is disclosed in U.S. Pat. No. 5,228,584 to Williams, which is hereby incorporated by reference in its entirety.

Various other electrical devices are often contained within a housing which can be mounted to a post, wall or other support. These devices typically include a cover that is hinged to the housing so that the cover can pivot between an open and closed position. These devices typically are mounted directly to a support or wall and an electrical supply wire is fed into the housing to operate the device. Examples of this type of device are disclosed in U.S. Pat. No. 4,063,110 to Glick and U.S. Pat. No. 4,546,418 to Baggio et al. Other devices can include a timer and an electrical outlet that is controlled by the timer. One such device is disclosed in U.S. Pat. No. 5,258,656 to Pawlick.

The prior electrical devices that contain an electrical component, such as a duplex receptacle or timer, are mounted directly to a wall or other support. The power supply is usually fed to the device by feeding an electrical cable through an opening in the side wall of the housing of the device. The power supply is often on the outer surface of the wall. Often these devices that contain an electrical component must be fastened to the outer surface of the wall or other support and cannot be connected directly to or mounted to an electrical junction box. Accordingly, a continuing need exists in the industry for an improved electrical assembly.

SUMMARY OF THE INVENTION

The present invention is directed to an electrical assembly, such as an outdoor electrical outlet assembly. The invention is further directed to an electrical box assembly that can be connected to and mounted on an electrical outlet box or can be mounted directly to a support surface.

Accordingly, a primary aspect of the invention is to provide a versatile electrical assembly that can be mounted and used in different environments.

Another aspect of the invention is to provide an electrical assembly containing one or more electrical components that can be mounted directly to an existing electrical box without the need to modify or relocate the electrical box.

A further aspect of the invention is to provide an electrical assembly where the assembly can be mounted directly to an electrical box that is either flush with the surface of the support or recessed within an opening in the support.

Still another aspect of the invention is to provide an electrical assembly that can be mounted to an electrical box where the electrical box is oriented with a longitudinal dimension oriented in the horizontal or vertical direction and where the electrical assembly can be mounted on and connected to the electrical box in a position that is independent of the orientation of the electrical box.

Still another aspect of the invention is to provide an electrical assembly having an adapter coupled to an electrical box and a housing assembly for electrical components where the adapter enables the spacing between the housing assembly and the electrical box to be adjusted and where the adapter allows the electrical assembly to be mounted in an orientation that is independent of the orientation of the adapter. The housing assembly includes a housing and faceplate to form an enclosed space for the electrical components.

A further aspect of the invention is to provide an electrical assembly having a housing assembly containing electrical components where the housing has a knock-out panel that, when removed, enables the housing to be mounted directly to an adapter that is coupled to an electrical box.

Another aspect of the invention is to provide an electrical assembly having an adapter that is securely coupled to an electrical box and a housing assembly for electrical components where the housing assembly is mounted to the adapter to fix the location of the electrical assembly to the electrical box and the structure supporting the electrical box.

The foregoing aspects of the invention are basically attained by providing an electrical assembly which comprises an adapter having a base for coupling the adapter to an electrical box. The coupling member is connected to the base, and has an access opening for receiving wiring from the electrical box. A housing having an internal dimension sufficient to support an electrical device is provided. A coupling member couples the housing to the coupling member of the adapter, and has an opening aligned with the access opening of the adapter.

The aspects of the invention are further attained by providing an electrical box assembly which comprises an adapter with a base with a dimension for coupling to an electrical box, a collar extending from the base and a wiring access opening. A housing having an internal dimension and supporting an electrical device is provided. The housing has a wall with an opening dimensioned to receive the collar for coupling the housing to the adapter.

The aspects of the invention are also attained by providing an electrical assembly which comprises a housing having a rear wall, at least one side wall and an open front side. The rear wall has a sleeve extending substantially perpendicular to the rear wall and extending toward the open front. The sleeve has a bottom end and an open front end, and a removable bottom panel coupled to an inner surface of the sleeve by a frangible line to close the bottom end of the sleeve. The bottom panel is removable to form an open channel through the sleeve. At least one electrical device is mounted in the housing. A face plate is coupled to the housing to close the open front end. The face plate has at least one opening to access the electrical device.

Other objects and advantages of the invention will become apparent from the following detailed description, which taken in conjunction with the drawings, discloses preferred embodiments of the invention.

BRIEF DESCRIPTION OF THE DRAWINGS

Referring to the drawings which form a part of this original disclosure:

FIG. 4 is a top plan view of the adapter in one embodiment of the invention;

FIG. 5 is a cross-sectional side view of the adapter taken along line 5—5 of FIG. 4;

FIG. 6 is cross-sectional side view of the assembly showing the assembly mounted to an electrical box;

FIG. 25 is a cross-sectional end view of the assembly of the embodiment of FIG. 7 showing the housing mounted directly to a support surface without the use of the adapter.

DETAILED DESCRIPTION OF THE INVENTION

The present invention is directed to a self-contained electrical assembly that can be mounted directly to a wall or other support and can be mounted directly to an electrical box. The invention is directed particularly to an outdoor electrical outlet assembly. The electrical assembly of the invention is designed to be able to be mounted directly to an existing electrical outlet box that is recessed in a wall without the need to attach the electrical box to a wall.

The present invention, in one embodiment of the invention, is a self-contained electrical assembly with a housing containing various electrical devices such as a duplex receptacle. In preferred embodiments of the invention, the assembly is adapted to be mounted to a support, such as a wall, or directly to an electrical box mounted on or in the wall. The assembly is adaptable to be mounted to an electrical box that is recessed from the outer surface of the wall or is flush with the outer surface of the wall. The assembly enables the assembly to be mounted to a recessed electrical box while compensating for variations in the depth of the recess of the electrical box, variations in the thickness of the wall and accommodating for obstructions that prevent the assembly from laying flat against a wall.

Figure 1:
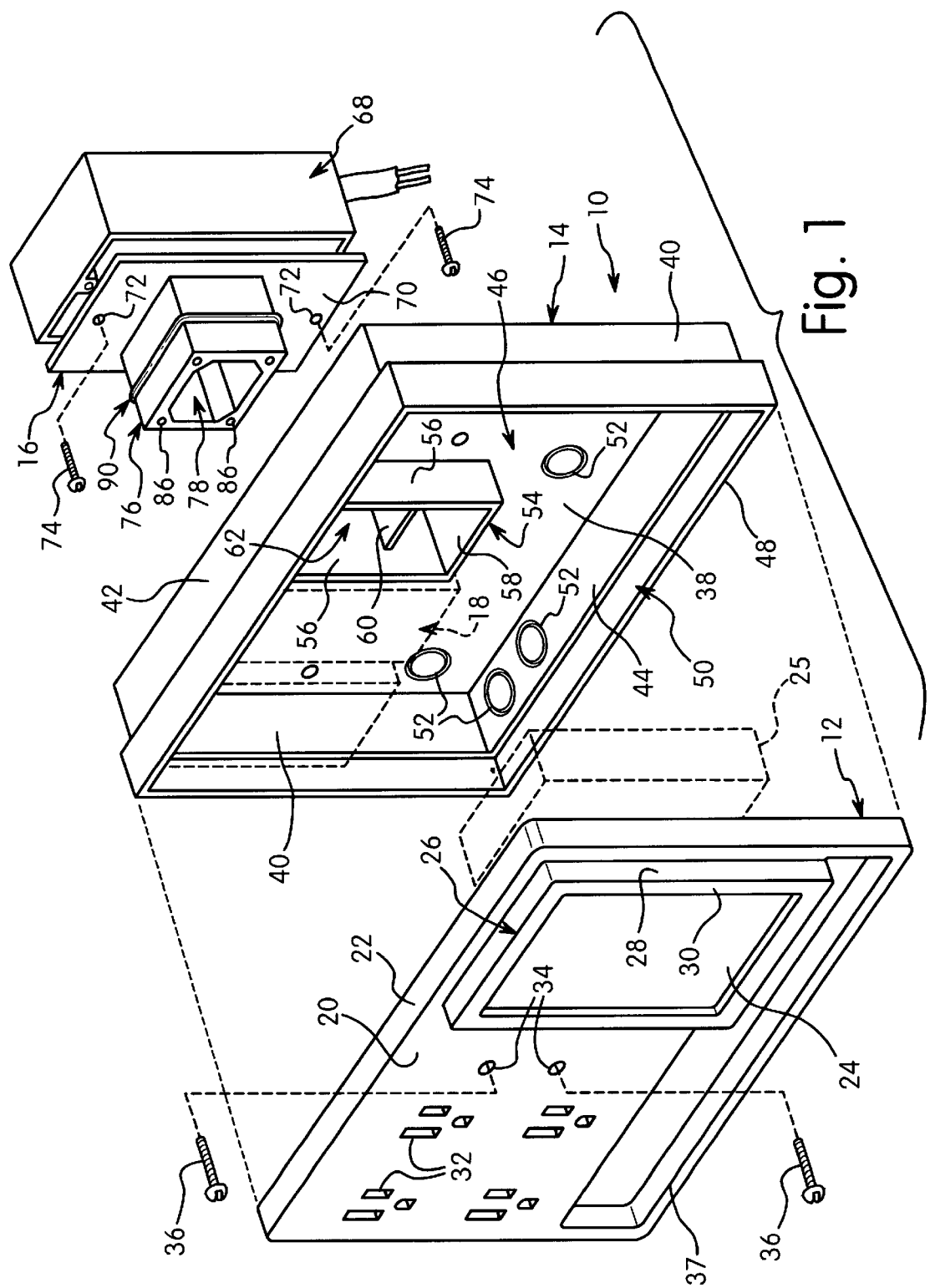
FIG. 1 is an exploded perspective view of the assembly in accordance with a first embodiment of the present invention showing the faceplate, housing and adapter.

FIGS. 1–6 show a first embodiment of the invention. Referring to the drawings, the electrical assembly 10 includes a faceplate 12, a housing 14 and an adapter 16 for mounting housing 14 and faceplate 12 to an electrical box as discussed hereinafter in greater detail. Faceplate 12 and housing 14 are coupled together to form a housing assembly. An electrical device 18 shown in phantom lines in FIG. 1 is mounted within housing 14 and enclosed by faceplate 12.

Faceplate 12, housing 14 and adapter 16 are preferably made from a suitable plastic material. The assembly is typically made by known injection molding processes so that the various structural components of the faceplate, housing and adapter are integrally formed as a single unit.

Faceplate 12 has a dimension to cover housing 14 and define an enclosure for the various electrical components. In the embodiment illustrated, faceplate 12 has a substantially rectangular configuration complementing the shape and dimensions of housing 14 and is formed with a substantially flat front wall 20. A flange 22 extends from the outer edges of front wall 20 in a rearward direction with respect to front wall 20 substantially perpendicular to the plane of front wall 20. Typically, flange 22 extends from the outer peripheral edge of front wall 20 from a rear side of front wall 20 a distance sufficient to couple faceplate 12 to housing 14. In the embodiment illustrated, flange 22 extends continuously around the perimeter of faceplate 12. In other embodiments, flange 22 can be discontinuous or can be provided on fewer than all sides. Preferably, flange 22 is continuous to provide a weatherproof enclosure.

Faceplate 12 includes an access opening 24 to receive an electrical device 25, shown in phantom lines in FIG. 1. Electrical device 25 can be, for example, a timer to control the operation of electrical device 18 by the operator. In the embodiment illustrated, access opening 24 is formed in a raised portion 26 extending outwardly from front wall 20 and encircling access opening 24. As shown in FIG. 1, raised portion 26 includes a side wall 28 extending substantially perpendicular from front wall 20 and a top wall 30 extending from a top end of a side wall 28. Top wall 30 extends radially inward from side wall 28 a distance to define access opening 24. Openings 32 are also formed in top wall 20 to form a duplex receptacle for receiving an electrical connection. In the embodiment shown, electrical device 18 is a duplex receptacle. Typically, the duplex receptacle is integrally formed with assembly 110. Alternatively, electrical device 18 can be a switch, timer or other device that aligns with an opening having a dimension complementing the dimensions of the electrical device. Apertures 34 are formed in front wall 20 and are dimensioned to receive a coupling member such as screws 36 for coupling faceplate 12 to adapter 16 as discussed hereinafter in greater detail.

In a preferred embodiment, faceplate 12 includes an opening 37 that has a dimension suitable to allow access to electrical wiring within assembly 10. A removable cover, not shown in FIG. 1, is preferably provided to close opening 37 when assembly 10 is installed.

Housing 14 includes a bottom wall 38, side walls 40, upper wall 42 and a lower wall 44. Side walls 40, upper wall 42, and lower wall 44 extend outwardly from the front face of bottom wall 38 to define an internal cavity 46 of housing 14. Internal cavity 46 has a dimension to support electrical devices 18 and the appropriate wiring connections. Preferably, side walls 40, upper wall 42 and lower wall 44 are contiguous and encircle internal cavity 40.

Figure 3:
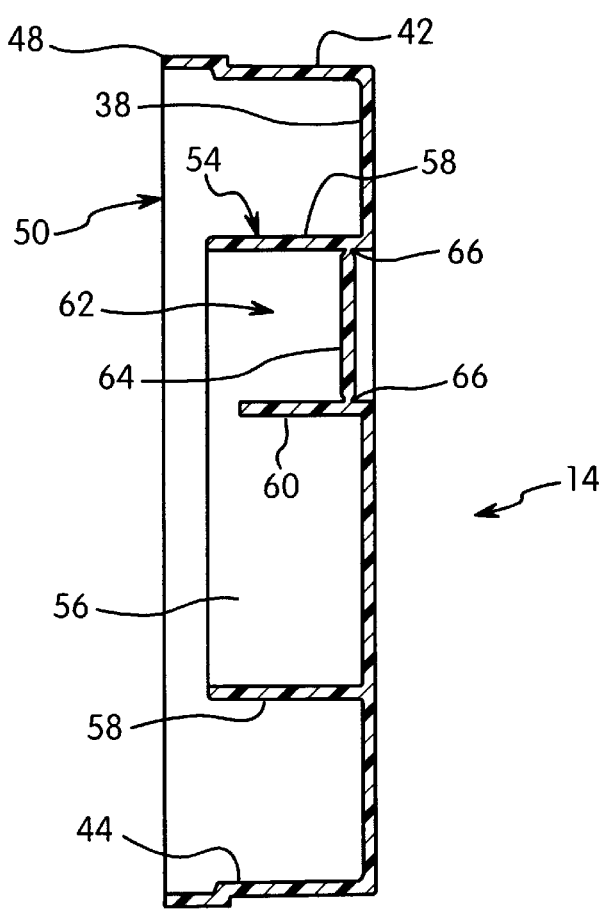
FIG. 3 is a cross-sectional side view of the housing taken along line 3—3 of FIG. 2.

Referring to FIGS. 1 and 3, a flange 48 extends from side walls 40, upper wall 42 and lower wall 44 to define an open front end 50 of housing 14. Flange 48 extends substantially parallel to side walls 40, upper wall 42 and lower wall 44 and has a dimension to mate with faceplate 12 when faceplate 12 is coupled to housing 14. In the embodiment illustrated, lower wall 44 and bottom wall 38 include knockout or pry-out plugs 52 which can be removed to feed electrical wiring into housing 14 in a conventional manner.

Figure 2:
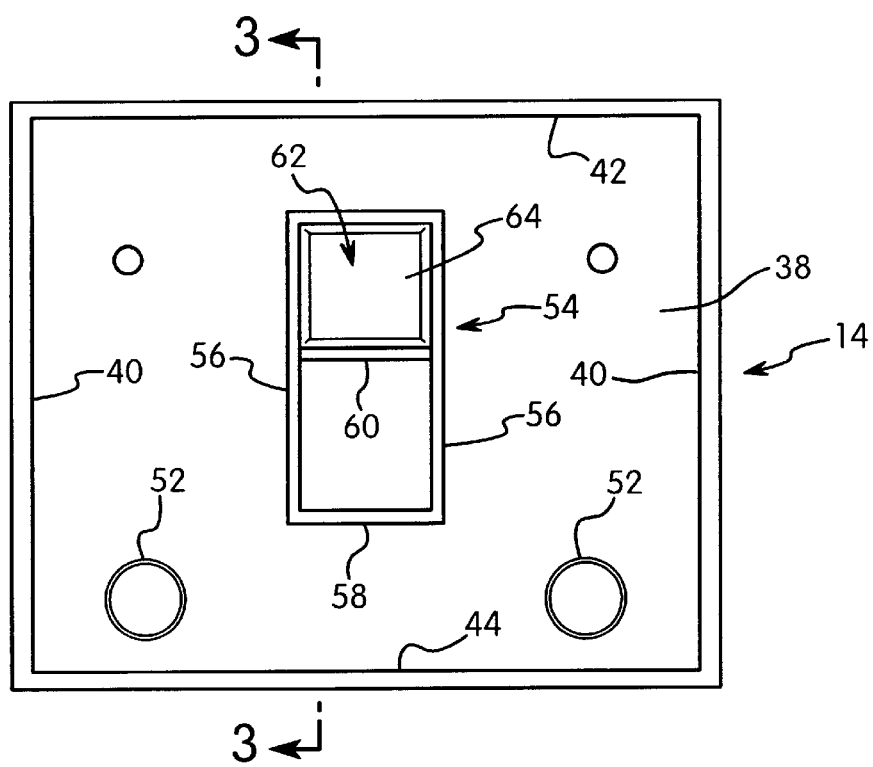
FIG. 2 is a front view of the housing of the embodiment of FIG. 1.

A sleeve 54 extends outwardly from bottom wall 38 as shown in FIGS. 2 and 3 toward the open front end 50 of housing 14. In the embodiment of FIGS. 1–6, sleeve 54 has a substantially rectangular shape with side walls 56 and end walls 58. In other embodiments, sleeve 54 can have other shapes. Typically, sleeve 54 has a symmetrical shape. Side walls 56 and end walls 58 extend substantially perpendicular to bottom wall 38 and have a height slightly less than the height of side walls 40, upper wall 42 and lower wall 44. Sleeve 54 includes an internal wall 60 extending between side walls 56 and defining an internal channel or passageway 62. In the embodiment illustrated, internal wall 60 extends perpendicular from bottom wall 38 and has a height slightly less than the height of side walls 56 and end walls 58. Alternatively, internal channel 62 has a height substantially equal to the height of side walls 56. Preferably, sleeve 54 has a height sufficient to mate with adapter 16 as discussed hereinafter. Sleeve 54 has a height that is less than the finished dimension of assembly 10 so that sleeve 54 does not interfere with faceplate 12 and enables electrical wiring to pass through internal channel 62 for connecting the various electrical components within assembly 10. In the illustrated embodiment, channel 62 preferably has a substantially square configuration and has a dimension sufficient to guide electrical wiring into housing 14 from an electrical box or other connection.

Referring to FIG. 3, channel 62 has a removable bottom wall 64 for closing the bottom end of channel 62. As shown in FIG. 3, removable bottom wall 64 is coupled to side walls 56, end wall 58 and opposing internal wall 60 by frangible lines 66 that can be broken to separate bottom wall 60 from housing 14 to define an open channel or passageway through bottom wall 38 into cavity 46 of housing 14. Frangible lines 66 enable bottom wall 64 to be readily removed from housing 14 to open the bottom end of channel 62. The resulting opening in bottom wall 64 of housing 14 defines a coupling member for coupling housing 14 to adapter 16 as discussed hereinafter.

Referring to FIGS. 4–6, adapter 16 defines a mounting member for housing 14 and has a shape and dimension for coupling to housing 14 and for coupling to a standard electrical box 68 as shown in FIG. 6. Adapter 16 in the preferred embodiment has a substantially planar base 70 having a dimension corresponding substantially to the outer dimensions of a standard electrical box 68. In the illustrated embodiment, electrical box 68 is a standard box commonly used for supporting a duplex receptacle, multiple electrical receptacles, electrical switch or other electrical device. Alternatively, electrical box 68 can be a ganged box or a molded two gang box. Preferably, adapter 16 has a dimension corresponding to the electrical box being used so adapter 16 can be coupled to the electrical box.

Apertures 72 are formed along opposite ends of base 70 for receiving coupling screws 74 to couple adapter 16 to electrical box 68. A collar 76 having an open channel 78 extends from a top side of base 70 as shown in FIG. 5 and defines a coupling member for coupling housing 14 to adapter 16. Channel 78 defines an access opening in adapter 16 for directing electrical wiring from electrical box 68 into housing 14. Collar 70 has a shape and dimension corresponding to the internal dimension of channel 62 of sleeve 54 in housing 14. As shown in FIG. 4, channel 78 of adapter 16 has a substantially square configuration with side walls 80. As shown in FIG. 5, side walls 80 have a bottom end 82 coupled to base 70 and extend to an outer end 84 spaced from base 70. Apertures 86 are formed in outer end 84 at each corner of collar 76 for receiving a threaded screw. The outer surface of side walls 80 include a recess 88 having a substantially U-shaped cross-section and extending completely around collar 76. Recess 88 has a dimension to receive an annular seal member such as a flexible O-ring 90.

Electrical assembly 10 is used for enclosing and supporting an electrical device such as a duplex receptacle and can be mounted to a support surface 92 as shown in FIG. 6. In the embodiment illustrated, support surface 92 is a wall or external siding material having an opening 94 to expose electrical box 68. Electrical box 68 is mounted to a suitable support such as a wall stud, not shown, according to standard construction practice. As shown in FIG. 6, electrical box 68 has an outer face 96 defining an open end 98 of electrical box 68 that is recessed from an outer face 100 of support surface 92.

O-ring 90 is fitted in recess 88 of collar 76 of adapter 16 and adapter 16 is coupled to outer face 96 of electrical box 68 by screws 74 or other fasteners as shown in FIG. 6. In preferred embodiments, base 70 of adapter 16 has a shape and dimension complementing the dimensions of electrical box 68 to completely close the open end of electrical box 68. Bottom wall 64 of channel 62 is removed by breaking along frangible lines 66. Housing 14 is then positioned on collar 76 so that collar 76 extends through channel 62. Housing 14 slides over collar 76 until bottom wall 38 of housing 14 contacts support surface 92. Electrical wires 102 are fed from electrical box 68 through channel 78 and connected to electrical device 18 as shown in FIG. 6. Faceplate 12 is then fitted onto housing 14 and secured by screws 36. As shown in FIG. 6, screws 36 extend through faceplate 12 and are threaded into apertures 86 in outer end 84 of collar 76 to secure housing 14 and faceplate 12 to adapter 16. Screws 36 are tightened to draw faceplate into contact with housing 14 and to force bottom wall 38 of housing 14 into contact with support surface 92, thereby securing housing 14 and faceplate 12 in a fixed position with respect to support surface 92 and electrical box 68. As shown in FIG. 6, recess 88 in collar 76 is positioned so that O-ring 90 is fitted between the outer surface of collar 76 and the inner surface of channel 62 to form a seal. Preferably, O-ring 90 forms a weather-resistant seal to inhibit the penetration of moisture and dust particles.

In the embodiment illustrated, assembly 10 is coupled directly to an existing electrical box 68 that is recessed in the wall. In alternative embodiments, housing 14 can be mounted directly to a wall or other support surface without the use of adapter 16 and an existing electrical box. In embodiments where adapter 16 is not used, bottom wall 64 of channel 62 remains attached to sleeve 54 so that channel 62 has a closed bottom end. Housing 14 can be attached directly to a wall by screws or other fasteners extending through openings in bottom wall 38. One or more knock-out plugs 52 in side wall.40, lower wall 44, and bottom wall 38 of housing 14 can be removed so that electrical wiring can be directed into housing 14. Faceplate 12 is coupled to housing 14 by screws or other fasteners that are received in suitable screw holes in housing 14 to close the open top end of housing 14. In one embodiment, screws extend through openings in bottom wall 38 of housing 14 and are received in screw bosses or posts integrally formed in face plate 12.

In preferred embodiments, channel 62 of sleeve 54 in housing 14 is symmetrical and has a shape complementing the shape of collar 76 of adapter 16. In the illustrated embodiment, channel 62 and collar 76 have a square configuration although other symmetrical shapes can be used. The symmetrical configuration of channel 62 and collar 76 enable adapter 16 to be mounted in different orientations while allowing housing 14 and the housing assembly to be mounted to adapter 16 and oriented in a normal upright position shown in FIG. 6. In the embodiments shown in FIG. 6, electrical box 68 is a standard electrical box having a rectangular shape with its longitudinal dimension oriented in a vertical direction. Alternatively, electrical box 68 with adapter 16 can be oriented with its longitudinal dimension oriented in a horizontal direction. The symmetrical shape of collar 76 enables adapter 16 to mate with housing 14 in different angular orientations with respect to housing 16. The non-circular shape of sleeve 54 and collar 76 limits rotation of housing 14 with respect to adapter 16. Collar 76 includes screw-receiving apertures 86 in each corner to accommodate for the different orientations of adapter 16 with respect to housing 14.

Embodiment of FIGS. 7–25

Figure 7:
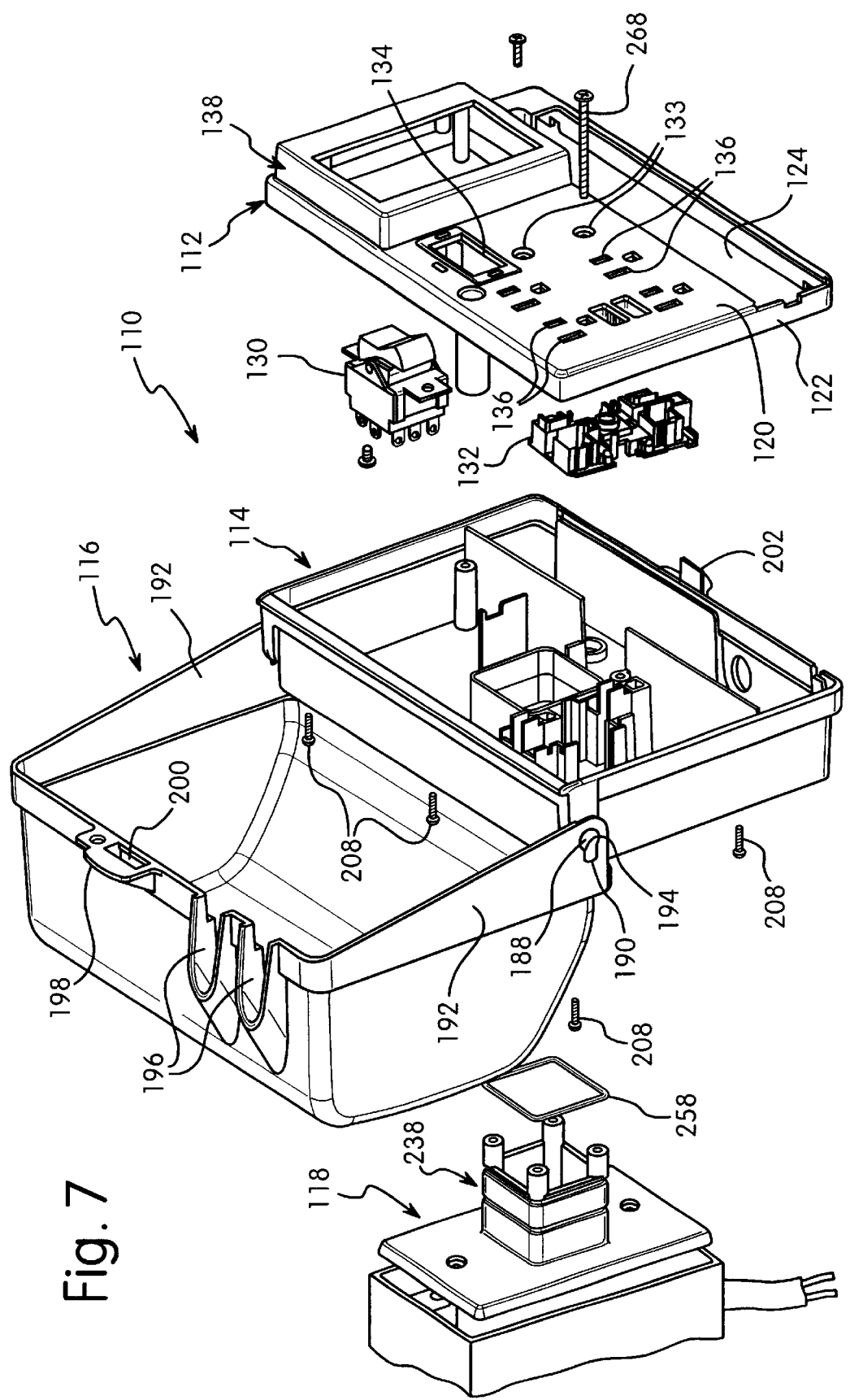
FIG. 7 is an exploded perspective view of a second embodiment of the invention showing the faceplate, housing with the hinged cover and the adapter.

Referring to FIGS. 7–25, a second embodiment of the invention is illustrated. As shown in FIG. 7, electrical housing assembly 110 is an outdoor electrical device having a weatherproof enclosure. Electrical housing assembly 110 includes a faceplate 112, a housing 114 having a pivotally mounted cover 116, and an adapter member 118. Faceplate 112 and housing 114 are coupled together to form a housing assembly.

Figure 8:
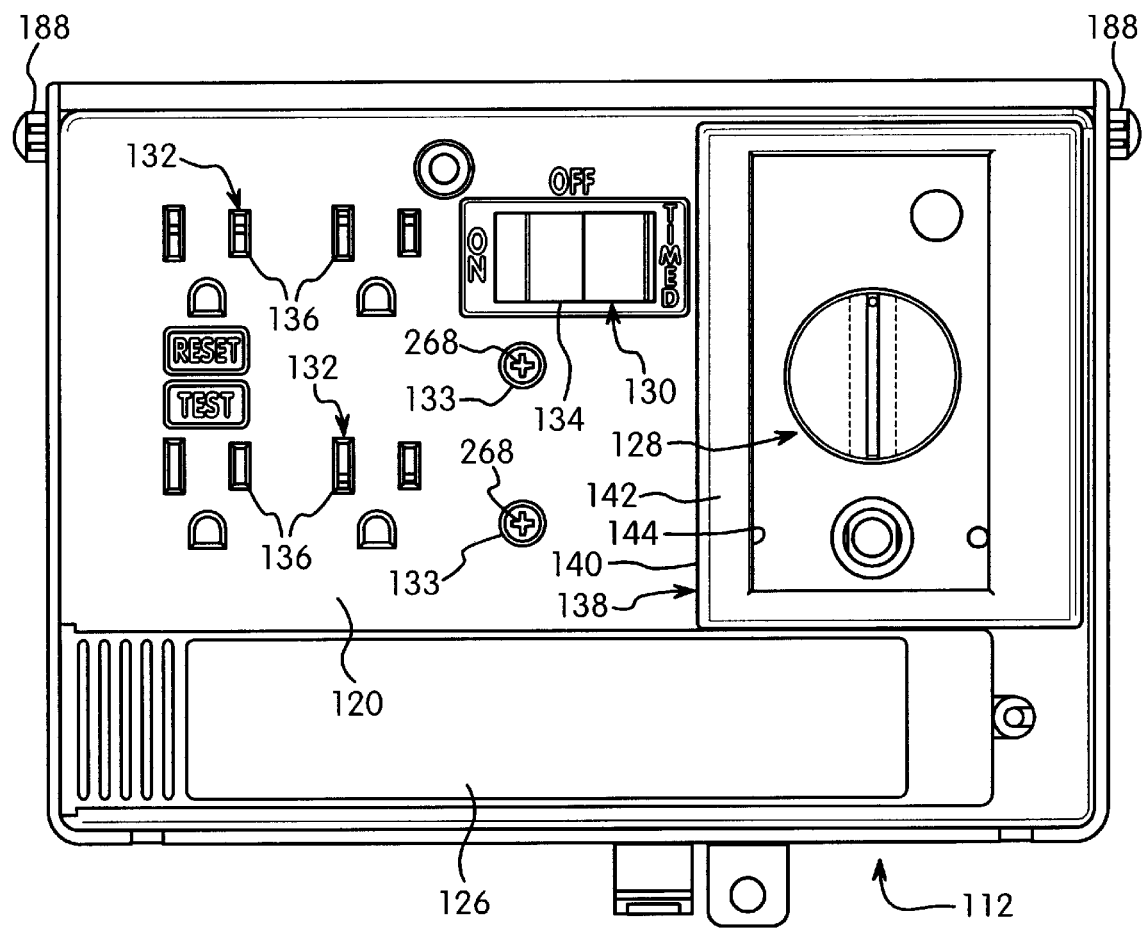
FIG. 8 is a front view of the housing and faceplate with the cover removed showing the electrical components mounted in the housing.
Figure 9:
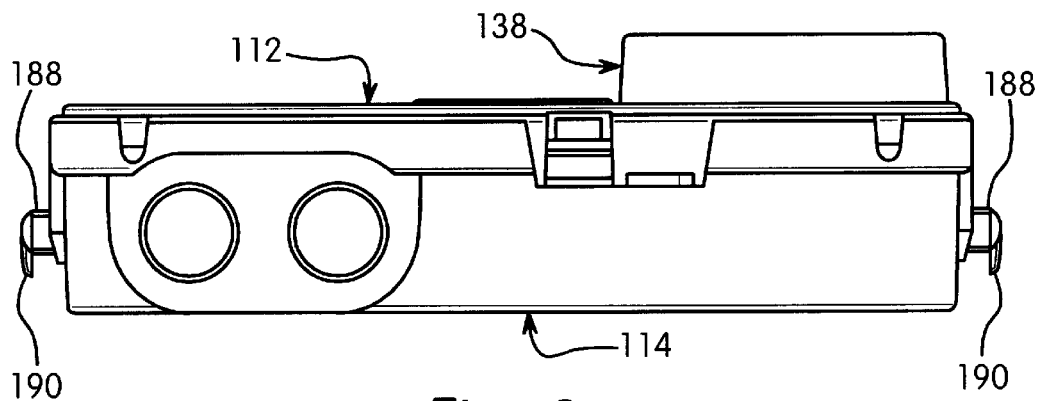
FIG. 9 is an end view of the housing and faceplate as seen from the bottom side of the housing of FIG. 8.
Figure 10:
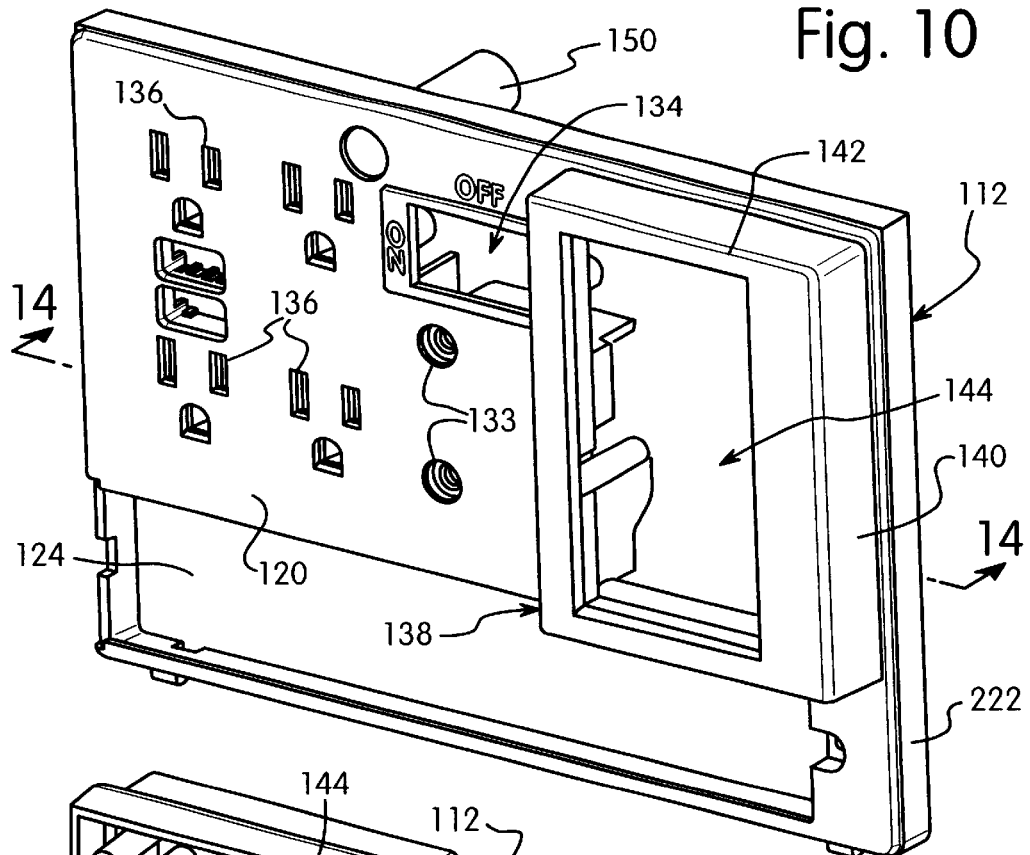
FIG. 10 is a perspective view of the front of the faceplate in one embodiment of the invention.

Faceplate 112 has a dimension for coupling to housing 114 and for displaying various electrical devices such as electrical receptacles, switches and the like. Faceplate 112 has a substantially planar front wall 120. A flange 122 is integrally formed with the outer edge of front wall 120 and extends in a direction substantially perpendicular to front wall 120 a distance for coupling with housing 114. Front wall 120 has an access opening 124 to expose wiring contained within housing 114. A suitable cover plate 126, as shown in FIG. 8, is removably coupled to front wall 120 to close access opening 124.

Faceplate 112 is constructed to support various electrical devices and components for use by the operator. In the embodiment illustrated in FIG. 8, the electrical devices include a timer 128, a switch 130 and duplex outlet receptacles 132 that are aligned with suitable openings in faceplate 112. Front wall 120 includes an opening 134 for receiving switch 130 in a position to be operable by the operator. Spaced apertures 136 are aligned with outlet receptacle 132 for receiving a standard electrical plug. In the illustrated embodiment, two spaced apart apertures 133 are provided in front wall 120 for receiving coupling screws to couple assembly 110 to adapter member 118 as discussed hereinafter in greater detail. Front wall 120 includes a raised portion 138 extending from front wall 120. Raised portion 138 includes side walls 140 and a top wall 142. Top wall 142 extends inwardly from side walls 140 to define an opening 144 for receiving timer 128 as shown in FIG. 8.

Figure 11:
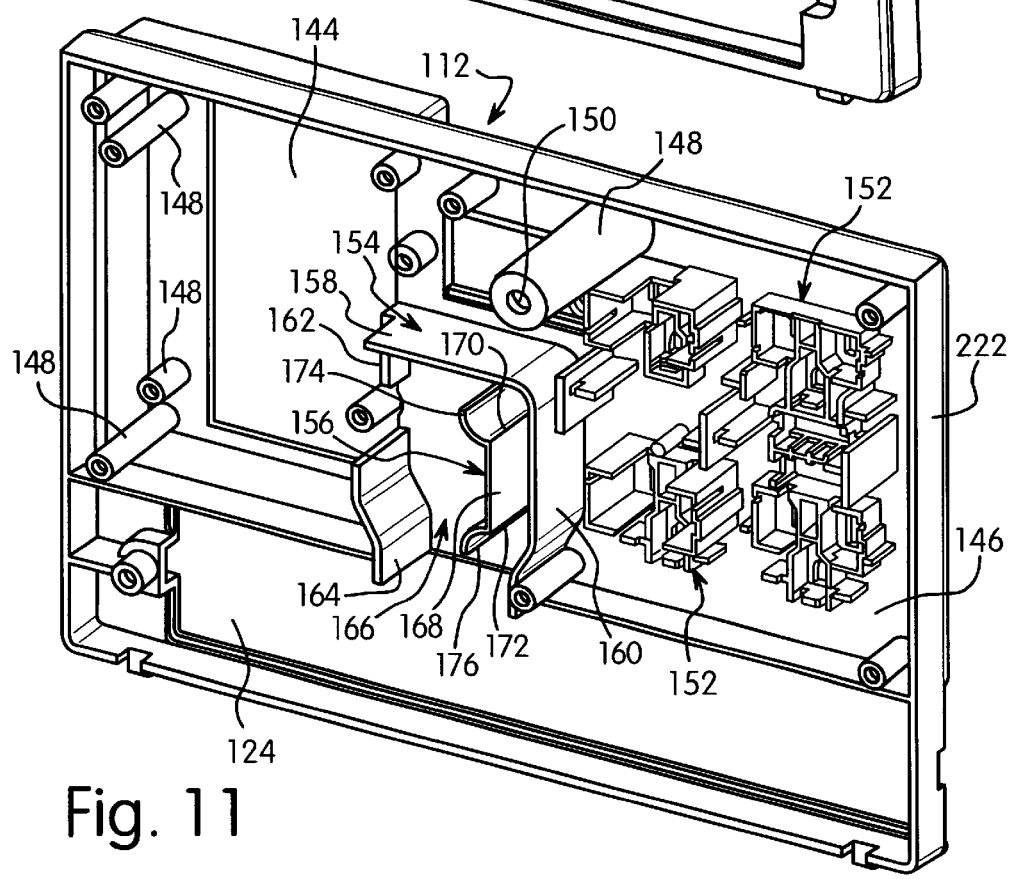
FIG. 11 is a perspective view of the rear side of the faceplate of FIG. 8.

Referring to FIG. 11, front wall 120 of faceplate 112 has an inner surface 146 with mounting posts 148 having a screw receiving aperture 150 and positioned for mating with a complementing post extending from housing 114. Preferably, screws pass through axial passage posts 204 and mate with posts 148. Inner surface 146 includes support elements 152 integrally formed with front wall 120 for supporting duplex receptacle outlet 132. In this embodiment, duplex receptacle 132 is integrally formed with housing 114 and face plate 112. In alternative embodiments, a separate duplex receptacle can be mounted within assembly 110.

Figure 12:
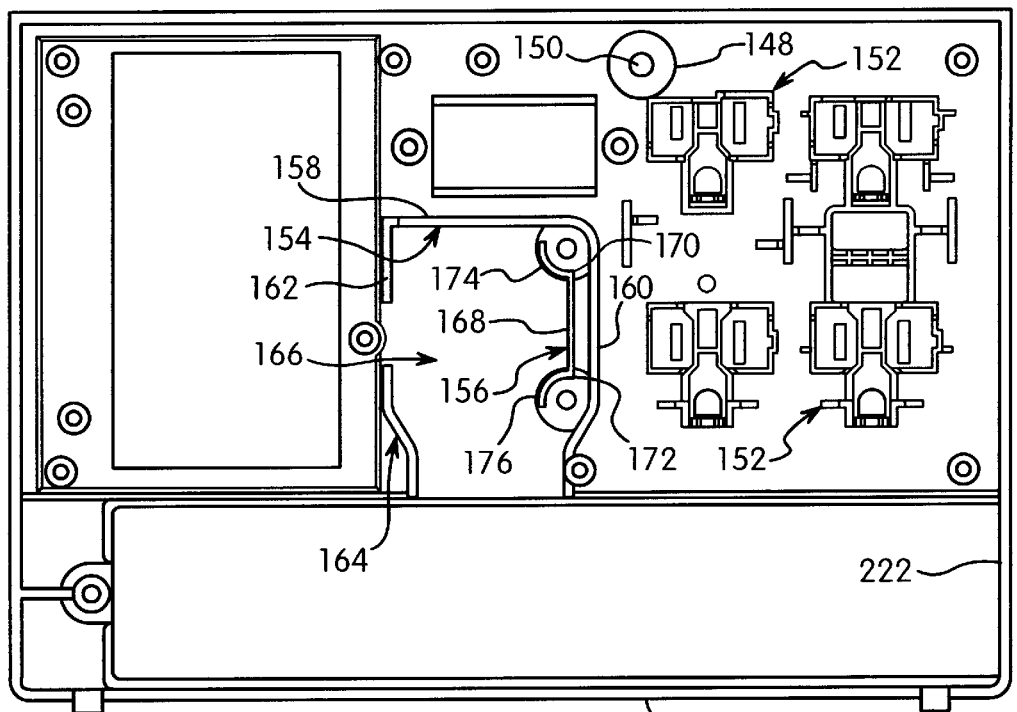
FIG. 12 is a top plan view of the rear side of the faceplate.

Referring to FIGS. 11 and 12, a guide wall 154 and a guide plate 156 extend from inner surface 146 of front wall 120. Guide wall 154 extends substantially perpendicular to the plane of front wall 120 and includes a first leg 158 and a second leg 160 to define a substantially L shaped member. First leg 156 extends in a generally horizontal direction with respect to faceplate 112. Second leg 160 is oriented substantially perpendicular to first leg 158 in a generally vertical direction with respect to faceplate 112. First leg 158 is aligned with apertures 133 for receiving connecting screws as shown in FIG. 12. As shown in FIGS. 11 and 12, a tab 162 is coupled to the end of first leg 158 and extends perpendicular to the plane of front wall 120 having a height less than the height of first leg 158 and second leg 160. A second guide wall 164 is aligned with tab 162 of second leg 158 to define a cavity 166 therebetween for receiving adapter 118 as discussed hereinafter in greater detail. Second guide wall 164 as shown in FIG. 12 is spaced from second leg 160 to allow electrical wires to be fed through adapter 118 and into the internal cavity of assembly 110.

Figure 13:
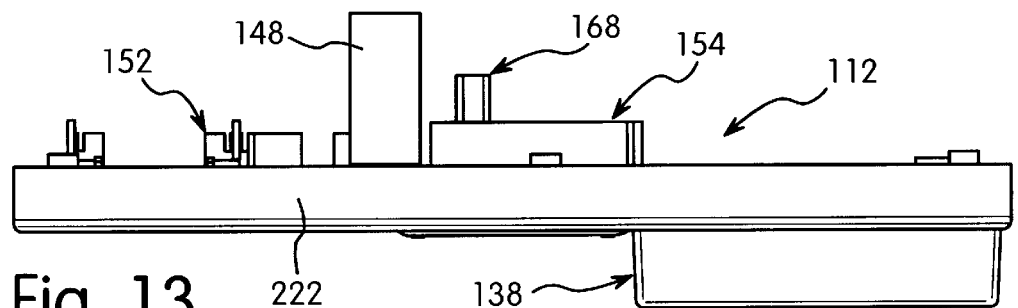
FIG. 13 is an end view of the faceplate as seen from the top side of the faceplate of FIG. 10.
Figure 14:
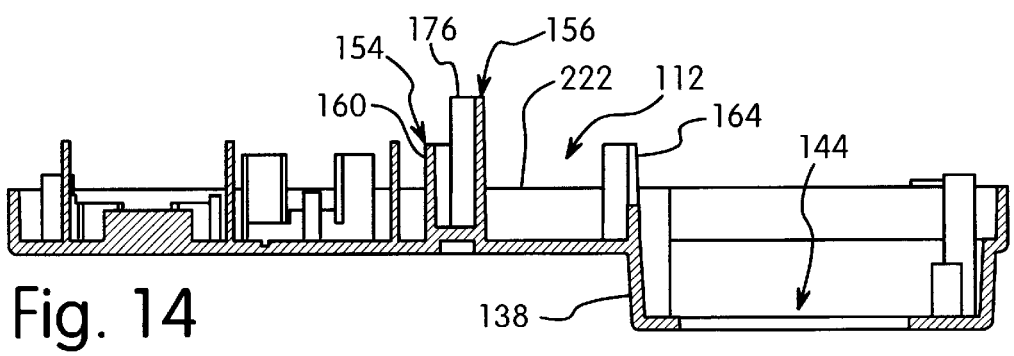
FIG. 14 is a cross-sectional view of the faceplate taken along line 14—14 of FIG. 10.

Guide plate 156 extends perpendicular to the plane of front wall 120 from inner surface 146 as shown in FIGS. 11 and 12 and is oriented generally parallel to first leg 160. Guide plate 156 has a height greater than the height of guide wall 154 so as to extend beyond guide wall 154 as shown in FIGS. 13 and 14. Guide plate 156 includes a central planar portion 168 having side edges 170 and 172. Semi-circular arms 174 and 176 are coupled to side edges 170 and 172, respectively, of planar portion 168. As shown in FIG. 12, semi-circular arms 174 and 176 have a concave side facing apertures 133 and oriented substantially concentric with apertures 133. Semi-circular arm 174 faces the intersection of first leg 158 and second leg 160 of guide wall 154. Guide wall 154 and guide plate 156 are spaced-apart a distance to mate with adapter 118. Guide plate 156 is dimensioned to slide into adapter 118 when assembly 110 is coupled with adapter 118. Guide plate 156 preferably has a length to protect wiring passing through cavity 166 from screws passing through apertures 133.

Figure 15:
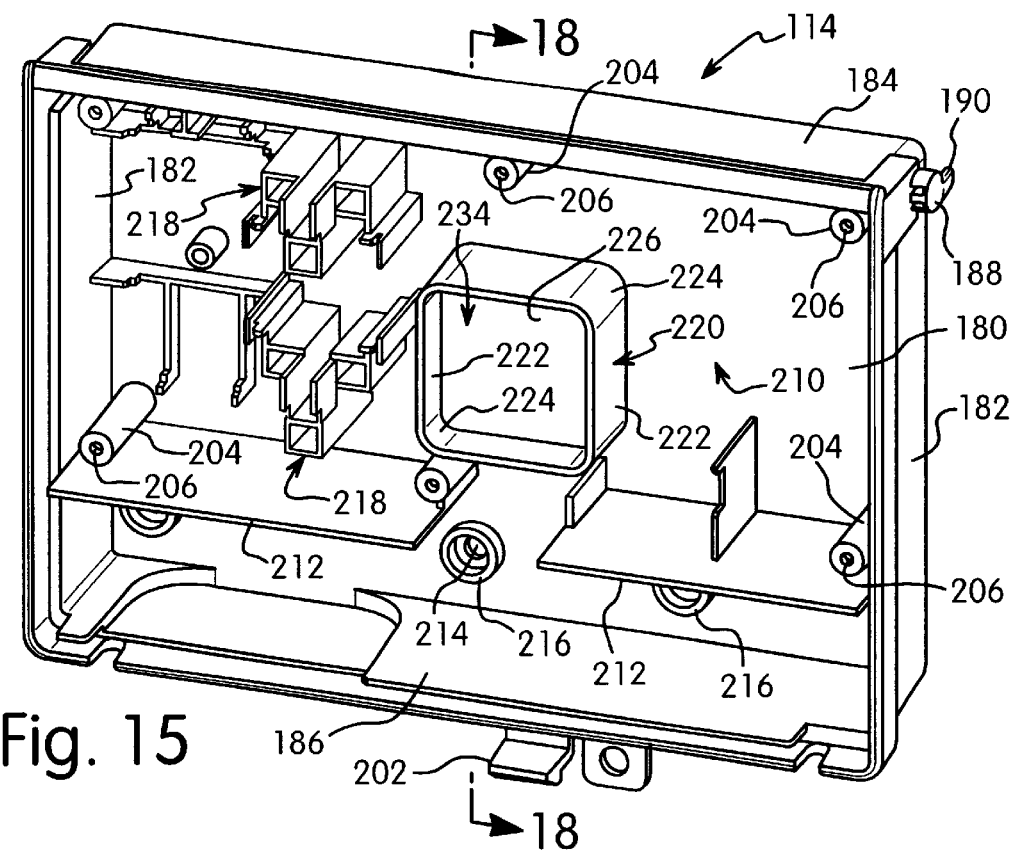
FIG. 15 is a perspective view of the front side of the housing of FIG. 7.
Figure 16:
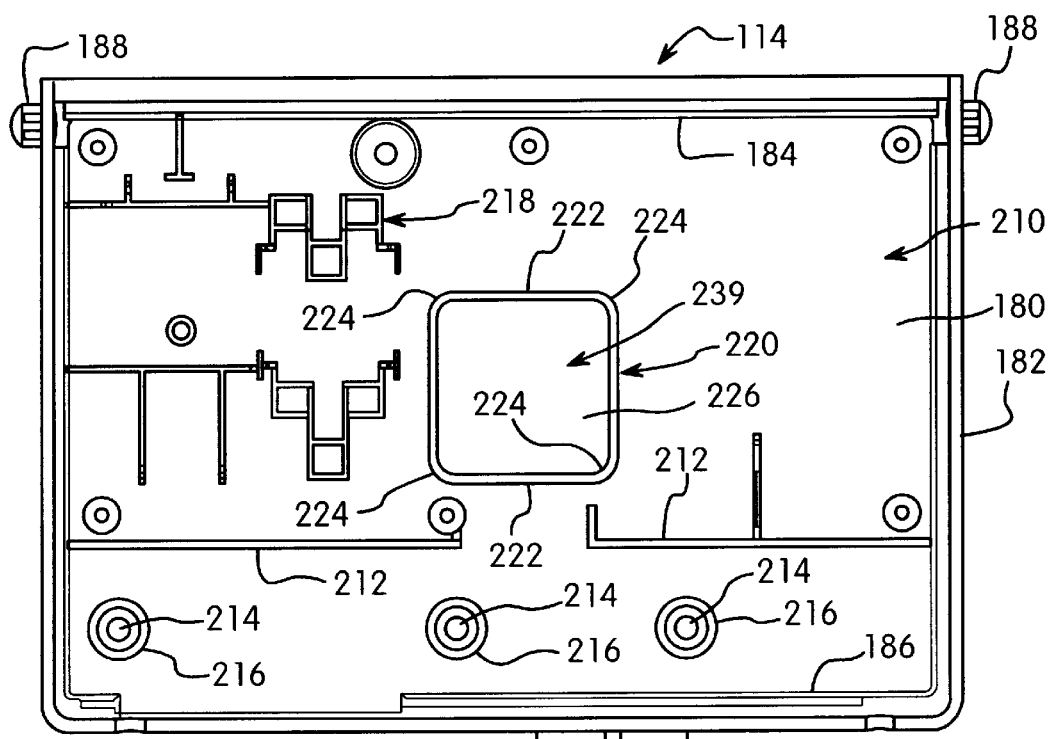
FIG. 16 is a top plan view of the front side of the housing of FIG. 15.

Housing 114 has a dimension to receive the electrical components and to receive faceplate 112 in a manner similar to the previous embodiment. Referring to FIGS. 15–18, housing 114 has a bottom wall 180, side walls 182, an upper wall 184 and a lower wall 186. In one preferred embodiment of the invention, side walls 182 include pivot pins 188 extending outwardly adjacent upper wall 184 as shown in FIGS. 15 and 16.

Referring to FIG. 7, cover 116 is pivotally connected to pivot pins 188 for pivoting between an open position and a closed position for covering faceplate 112. Cover 116 includes side panels 192 having an aperture 194 for receiving pivot pins 188 as shown in FIG. 7. In a preferred embodiment, pivot pins 188 include keys 190 to prevent unauthorized removal of cover 116 from housing 114. The cover and hinge assembly is preferably as disclosed in U.S. Pat. No. 5,228,584, which is incorporated herein by reference in its entirety. Cover 116 also includes U-shaped openings 196 to receive electrical wires that are connected to the duplex receptacle supported in assembly 110. A tab 198 having an aperture 200 extends from the outer end of cover 116 for connecting with latch member 202 extending from lower wall 186 of housing 114.

Referring to FIGS. 15 and 16, housing 114 includes a plurality of posts 204 having apertures 206. Posts 204 have an internal channel on a rear side of housing 114 with a diameter sufficient to allow the head of a screw to pass into the channel from the back side of housing 114 to extend from aperture 206 for coupling with complementing screw receiving apertures in faceplate 212. As shown in FIG. 7, screws 208 are inserted from the rear face of housing 114 to secure faceplate 112 to housing 14.

Housing 114 has an internal cavity to receive various electrical components. Internal dividers 212 extend from bottom wall 180 to separate internal cavity 210 into different compartments as desired. In a preferred embodiment of the invention, bottom wall 180 includes a plurality of apertures 214 having a dimension to receive a screw or other fastener for mounting housing to a support surface as desired. Preferably, apertures 214 are positioned below access opening 124 in faceplate 112. A collar 216 typically encircles apertures 214 to prevent screw heads or other fasteners from touching live wires and to prevent damage to the wires by the screws. Collar 216 also serves to strengthen bottom wall 180. Bottom wall 180 of housing 114 also includes integrally formed mounting supports 218 for supporting electrical devices such as a duplex receptacle. Mounting supports 218 are appropriately located to align with the apertures in faceplate 112.

Figure 17:
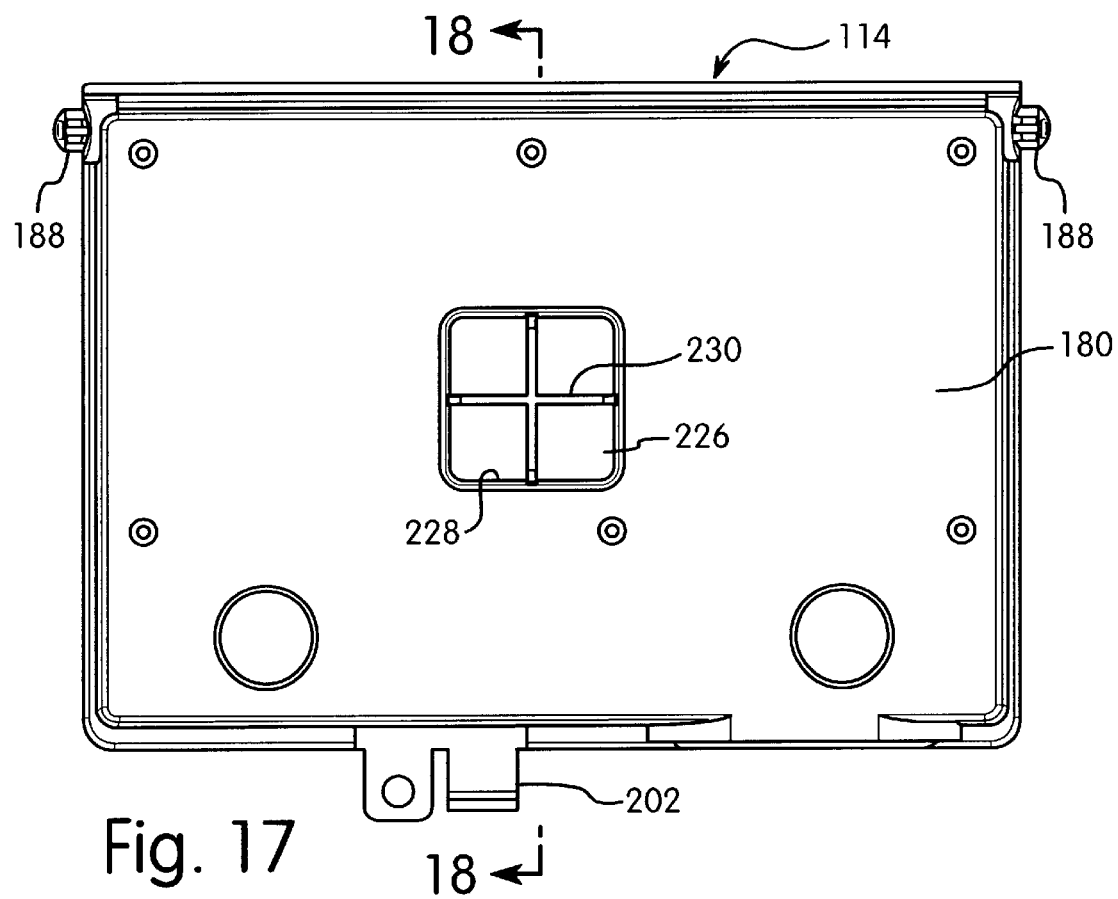
FIG. 17 is a plan view of the rear side of the housing of FIG. 15.
Figure 18:
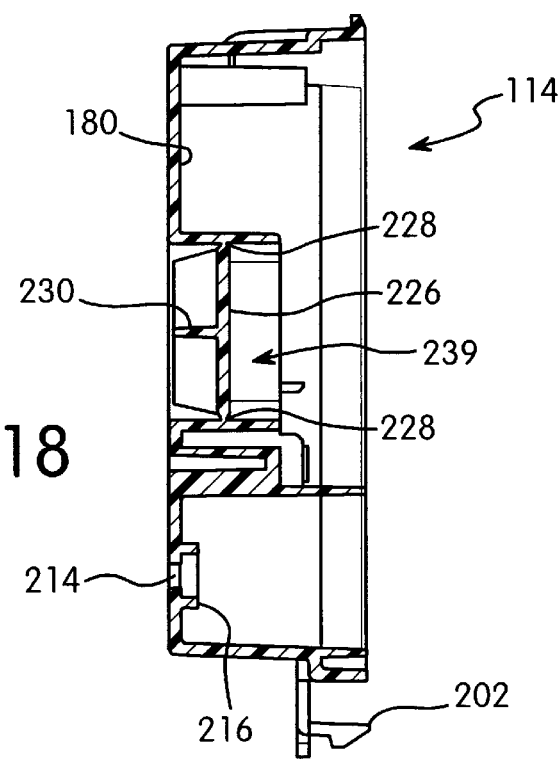
FIG. 18 is a cross-sectional end view of the housing taken along line 18—18 of FIG. 15.

Referring to FIG. 15, bottom wall 180 of housing 114 includes a sleeve 220 extending into internal cavity 210. Sleeve 220 has a substantially square configuration formed by side walls 222 and rounded corners 224. Side walls 222 of sleeve 220 have a height that is less than the height of the side walls of housing 114 as shown in FIG. 15. In preferred embodiments, sleeve 220 has a height to abut the top edge of guide wall 154 and guide wall 164 to define a continuous channel. In preferred embodiments, sleeve 220 includes a bottom wall 226 that is coupled to side walls 222 by frangible lines 228 as shown in FIG. 18. As shown in FIGS. 17 and 18, bottom wall 226 includes strengthening ribs 230 on the bottom face of bottom wall 226. Bottom wall 226 is removable from sleeve 220 by breaking frangible lines 228 to form an open channel and passageway through sleeve 220. The resulting open passageway in bottom wall 180 of housing 114 defines a coupling member for coupling housing 114 to adapter 118.

Figure 22:
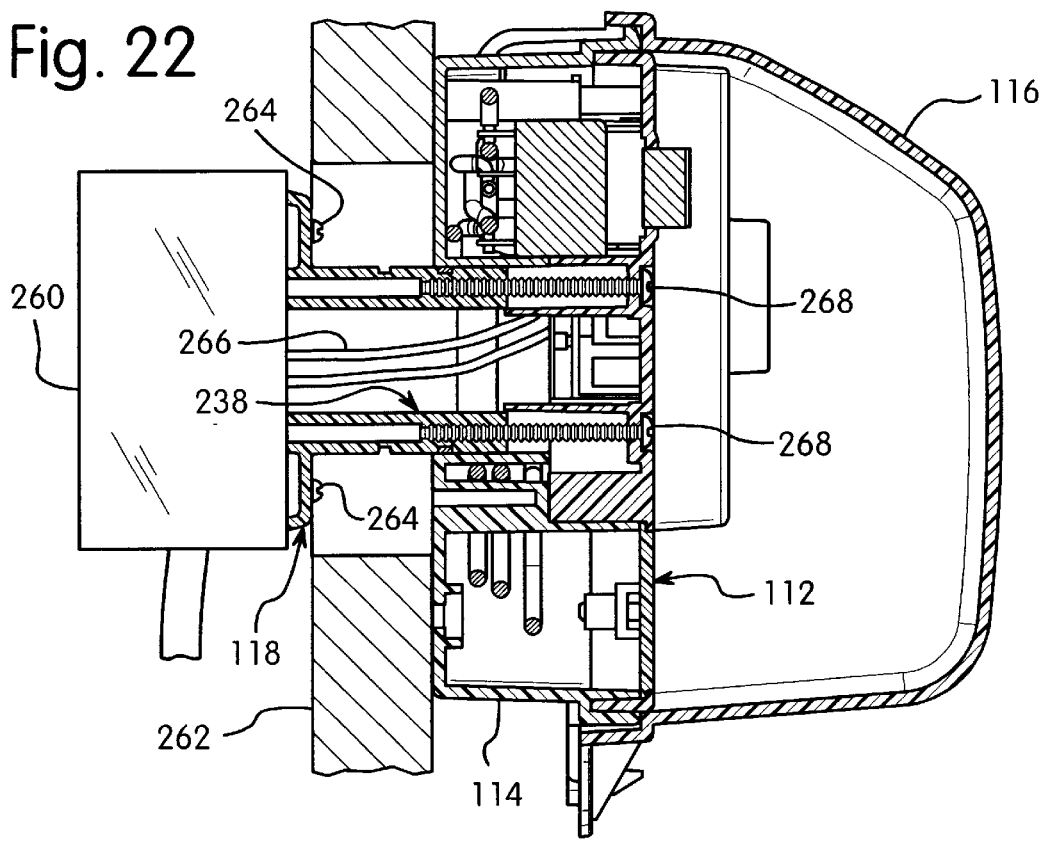
FIG. 22 is a cross-sectional side view of the assembly of the embodiment of FIG. 7 showing the assembly mounted to a recessed electrical box.
Figure 23:
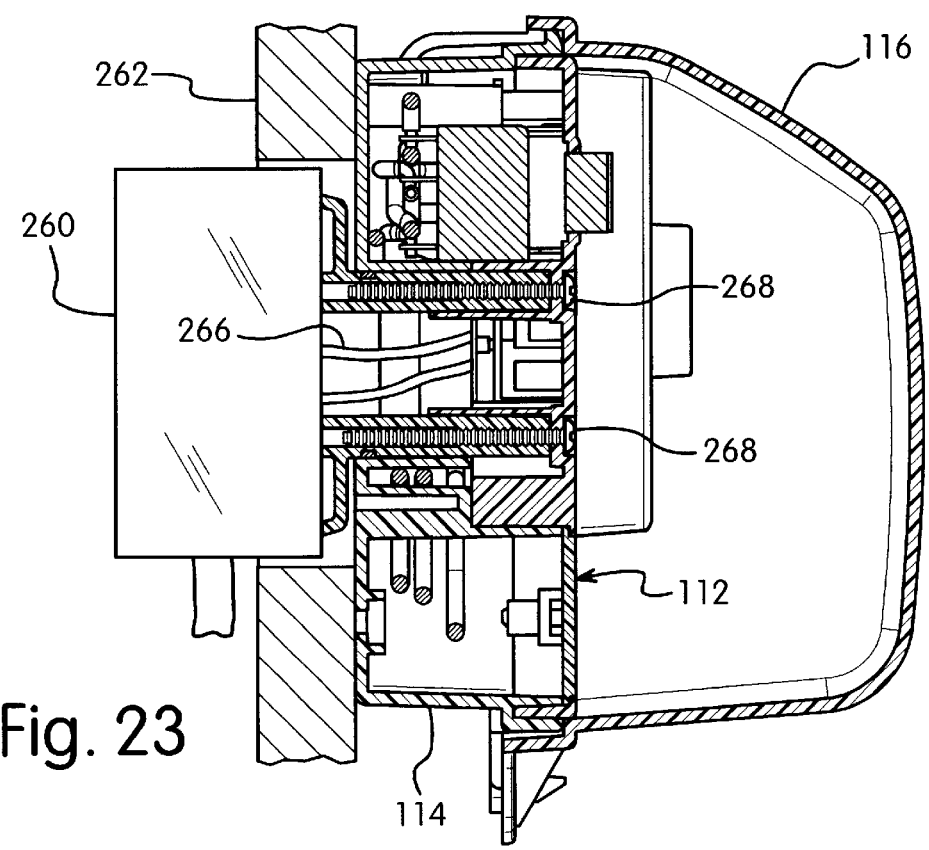
FIG. 23 is a cross-sectional side view of the assembly of the embodiment of FIG. 7 showing the assembly mounted to a support where the outer edge of the electrical box is positioned adjacent the outer face of the support.

Sleeve 220 has a shape and dimension complementing adapter 118. Sleeve 220 is oriented to align with guide walls 154 and 156 of faceplate 112 when faceplate 112 is coupled to housing 114. As shown in FIGS. 22 and 23, sleeve 220 is aligned with guide walls 154 and 156 so that the respective outer ends are contiguous and form a substantially continuous channel.

Figure 19:
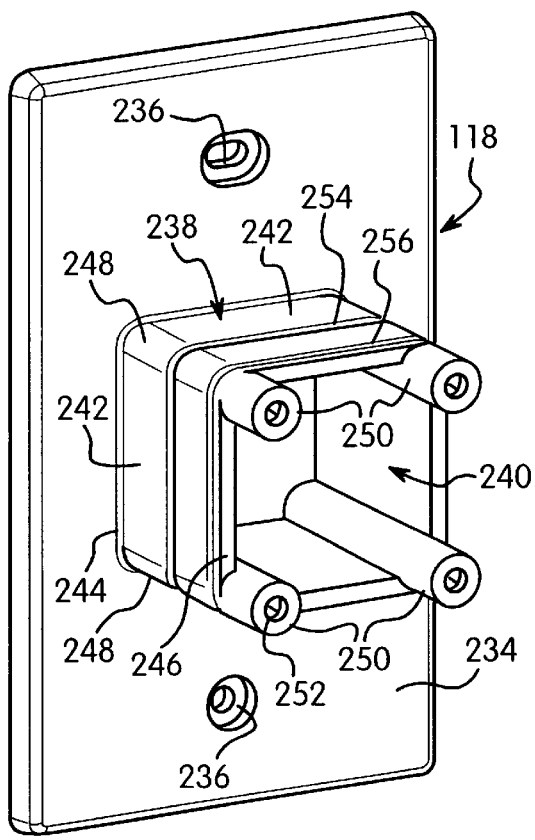
FIG. 19 is a perspective view of the front side of the adapter of the embodiment of FIG. 7.
Figure 20:
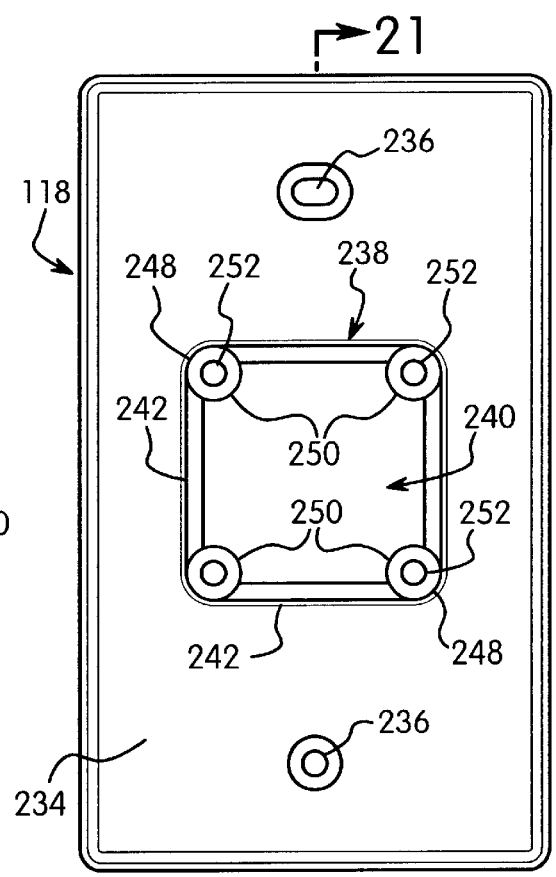
FIG. 20 is a top plan view of the adapter of FIG. 19.
Figure 21:
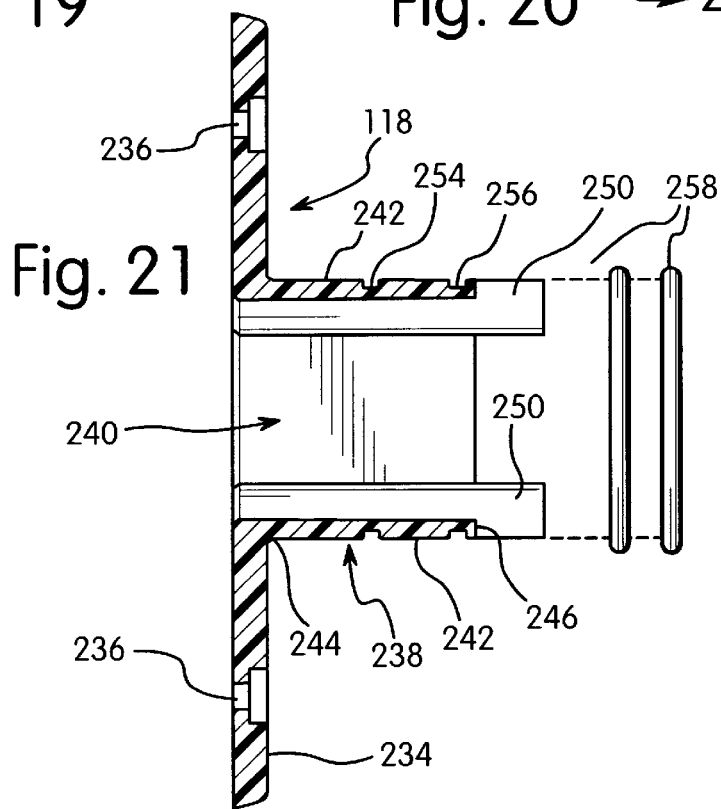
FIG. 21 is a cross-sectional side view of the adapter taken along line 21—21 of FIG. 20.

Referring to FIGS. 19–21, adapter 118 includes a base 234 having a substantially rectangular configuration and a dimension corresponding to the dimensions of a conventional electrical outlet box. In the illustrated embodiments, base 234 has a dimension for a single gang electrical box. Base 234 includes apertures 236 at opposite ends for receiving a screw or other fastener for coupling adapter 118 to the open end of an electrical box.

A collar 238 having an open channel 240 extends outwardly from base 234. Collar 238 has an outer dimension corresponding substantially to the shape and dimension of the inner surface of sleeve 220 of housing 114. Collar 238 has a substantially square configuration defined by side walls 242 having a bottom end 244 integrally formed with base 234 and a top end 246 extending outwardly from base 234. Side walls 242 converge to rounded corners 248 corresponding to the shape of sleeve 220. Coupling posts 250 extend from top end 246 at each corner 248. Each post 250 includes an axial aperture 252 for receiving a screw or other fastener for coupling housing 114 to adapter 118. In the illustrated embodiment, posts 250 have a length to contact the inner face of faceplate 112. Posts 250 also have a length to space the outer end of side wall 242 of collar 238 from faceplate 112 to allow the electrical wire to pass through channel 240 and into the cavity of assembly 110.

Referring to FIGS. 19 and 21, collar 238 includes a first recess 254 extending around the outer surface and positioned about the midpoint between bottom end 244 and top end 246 of each side wall 242. A second recess 256 is positioned adjacent top end 246 and extends around collar 238. Recesses 254 and 256 have a dimension to receive a seal member such as an O-ring 258 shown in FIG. 21 to provide a weatherproof seal between adapter 118 and the channel of sleeve 220. Preferably, collar 238 includes at least two spaced apart seal members to ensure that the space between adapter 118 and sleeve 220 is sealed at all positions of collar 238 within sleeve 220. In this manner, at least one of the seal members will always be in contact with sleeve 220.

Figure 24:
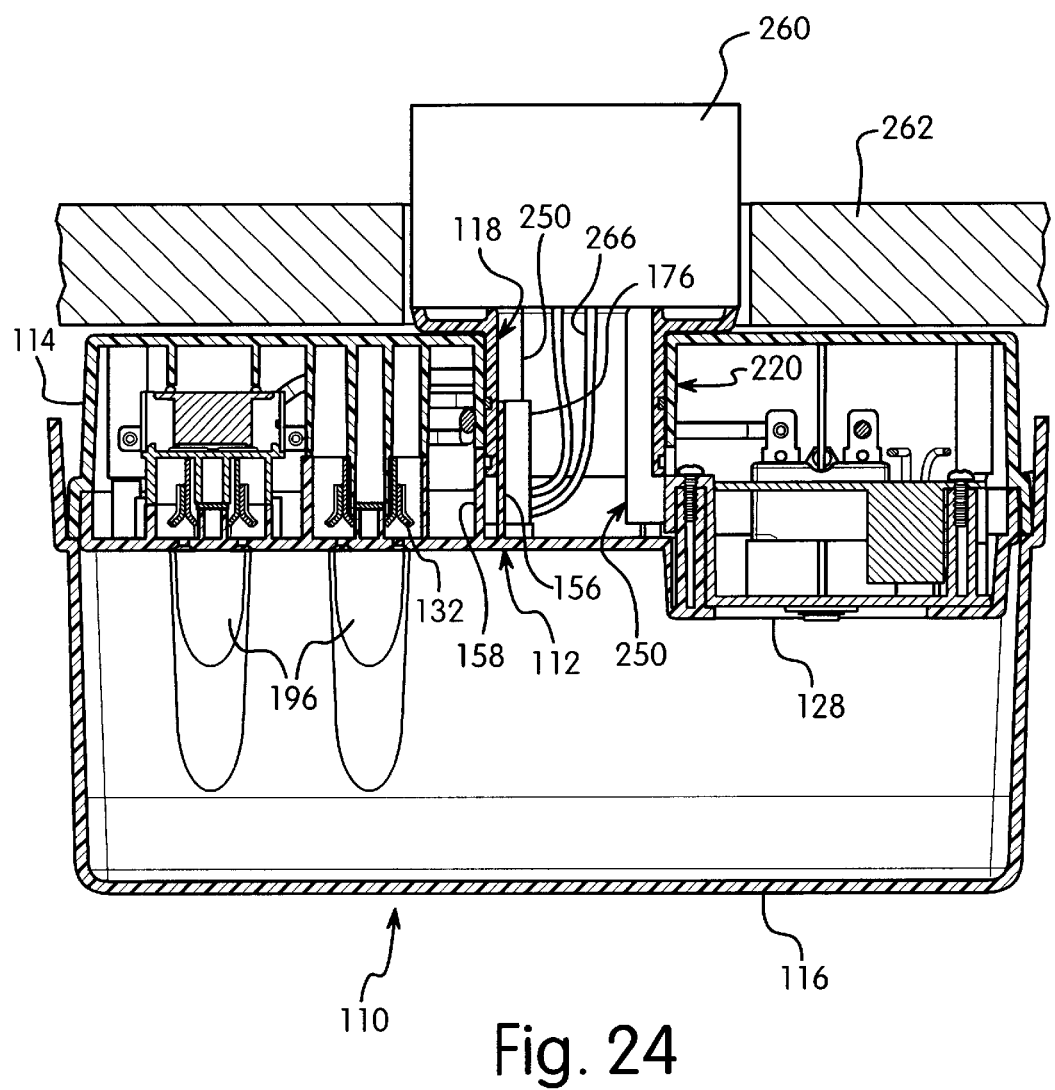
FIG. 24 is a cross-sectional top view of the assembly of FIG. 23.

Electrical assembly 110 is used in a similar manner as in the previous embodiment. In one embodiment, electrical assembly 110 is used in combination with an existing electrical outlet box 260 as shown in FIGS. 22–24. Referring to FIG. 22, electrical box 260 is recessed within a wall 262 or other support. Base 234 of adapter 118 is coupled to electrical box 260 by screws 264. Electrical wires 266 are fed from electrical box 260 through channel 240 of housing 114 into the housing assembly formed by housing 114 and faceplate 112 for coupling with the electrical devices. Housing 114 is positioned on adapter 118 so that collar 238 of adapter 118 passes through a channel 239 of sleeve 220. Collar 238 of adapter 118 slides through the opening in bottom wall 180 of housing 114 and through channel 239 until bottom wall 180 contacts support wall 262. Collar 238 and sleeve 220 of housing 114 form a telescoping coupling assembly for coupling housing 114 to adapter 118. Collar 238 is able to slide in a telescoping fashion within sleeve 220 to enable the selective spacing between housing 114 and adapter 118. The non-circular shape of collar 238 and sleeve 220 resist rotation of the housing 114 with respect to adapter 118. Screws 268 are inserted through the apertures 133 in faceplate 112 of the housing assembly and are screwed into the respective apertures 252 in post 250 of collar 238. Screws 268 are tightened to slide housing 114 over collar 238 and against the support wall 262. In the embodiment of FIG. 22, O-ring 258 is positioned in second recess 256 to provide a weatherproof seal between collar 238 and housing 114 at the end of collar 238. The telescoping movement between sleeve 220 and collar 238 allows the assembly to accommodate walls of different thickness. The assembly also enables housing 114 and the housing assembly to be surely mounted against a wall that is not stable and is not flat. By way of example, housing 114 and the housing assembly can be mounted against clapboards or vinyl siding that is not strong enough to support an electrical box.

In the illustrated embodiment, two apertures 133 are provided in faceplate 112 for receiving a coupling screw 268. Regardless of the orientation of collar 238, two posts 250 are always aligned with apertures 133 so that two screws 268 always couple housing assembly to adapter 118. In the illustrated embodiment, apertures 133 can be oriented horizontally or oriented to align with two diagonal posts 250. In still further embodiments, four apertures can be provided to receive screws that engage each of the posts.

In another embodiment shown in FIG. 23, electrical box 260 is positioned closer to the outer surface of wall 262 than in the embodiment of FIG. 22 so that base 234 of adapter 118 is substantially flush with the outer surface of support 262. As shown in FIG. 23, collar 238 of adapter 118 extends from the outer surface of support 262 a distance greater than the distance of the arrangement of FIG. 22. Collar 238 slides into channel 239 until housing is able to contact the outer surface of support 262 or the outer surface of base 234 of adapter 118. In this embodiment, O-ring 258 is positioned in first recess 254 to provide the weather resistant seal. Screws 268 arc tightened to secure housing 114 against the outer wall 262 as in the previous embodiment.

In preferred embodiments, collar 238 of adapter 118 and sleeve 220 of housing 114 are substantially square. In the illustrated embodiments, the electrical box is mounted with the longitudinal dimension oriented in a substantially vertical direction. However, the electrical box can be oriented with the longitudinal dimension extending in a horizontal direction. The square collar 238 of adapter 118 enables the electrical box to be oriented in a vertical and horizontal position while allowing housing 114 to be positioned in a normal upright orientation.

Assembly 110 is primarily intended for use with an existing electrical outlet box where electrical supply wires are fed through channel 240 of adapter 118 from the electrical box. In alternative embodiments shown in FIG. 25, housing 114 can be mounted directly to a support 270 by screws 272 extending through holes 214 in housing 114. In this embodiment, bottom wall 226 of sleeve 220 remains attached to close the bottom end of sleeve 220. Electrical wiring 274 is fed through the openings formed by removing knock-out plugs in housing 114.

In the illustrated embodiments, the coupling members are screws 268 that extend through apertures in face plate 112 and are threaded into adapter 118. In alternative embodiments, other fasteners can be used to couple the housing assembly to adapter 118. In one embodiment, an elongated strip member having external ratchet teeth can have one end connected to the adapter mounted on the electrical box. The strip member is then inserted through an opening in the housing assembly and drawn to pull the housing assembly against the adapter. The housing assembly in this embodiment preferably includes a cooperating ratchet or pawl for engaging the teeth on the strip member.

In another embodiment, the collar of the adapter can have external teeth that mesh with a ratchet mechanism on the housing assembly. In still another embodiment, the housing assembly can have a coupling member extending from the rear side and is received in a recess formed in the adapter.

While various embodiments have been chosen to illustrate the invention, it will be understood by those skilled in the art that various additions and modifications can be made without departing from the scope of the invention as defined in the appended claims.

What is claimed is:

1. An electrical assembly comprising:
   an adapter having a base for coupling said adapter to an electrical box, a first coupling member connected to said base, said adapter having an access opening for receiving wiring from said electrical box, and
   a housing assembly having an internal dimension sufficient to support an electrical device, said housing assembly having a passageway defining a second coupling member for receiving said first coupling member and coupling said housing assembly to said adapter, said passageway of said housing assembly being aligned with said access opening of said adapter and where said first coupling member extends into said passageway.

2. The electrical assembly of claim 1, wherein said housing assembly includes a wall having an opening defining said second coupling member of said housing assembly and where said opening defines said passageway in said housing assembly.

3. The electrical assembly of claim 2, wherein said adapter has a collar defining said first coupling member of said adapter and where said collar extends through said passageway in said housing assembly for coupling said housing assembly to said adapter.

4. The electrical assembly of claim 1, wherein said housing assembly includes a faceplate and said electrical assembly further comprises at least one fastener extending from said faceplate and aligned with said passageway in said housing assembly and being coupled to said adapter for coupling said housing assembly to said adapter.

5. An electrical assembly comprising,
   an adapter having a base for coupling said adapter to an electrical box, a first coupling member connected to said base, said adapter having an access opening for receiving wiring from said electrical box; and
   a housing assembly having an internal dimension sufficient to support an electrical device, said housing assembly having a second coupling member for coupling said housing assembly to said first coupling member of said adapter, said housing assembly having a passageway aligned with said access opening of said adapter;
   said first coupling member on said base comprising a collar having a dimension to extend through said passageway in said housing assembly, and where said passageway in said housing assembly has a dimension complementing said dimension of said collar and wherein said access opening in said adapter extends axially through said collar.

6. The electrical assembly of claim 5, wherein said collar on said base has a substantially square cross-section and said passageway in said housing assembly has a substantially square cross-section.

7. The electrical assembly of claim 6, wherein said housing assembly comprises a guide sleeve adjacent said passageway for cooperating with said collar.

8. The electrical assembly of claim 7, wherein said guide sleeve surrounds said passageway in said housing assembly.

9. The electrical assembly of claim 8, further comprising a seal member between said collar and said guide sleeve.

10. The electrical assembly of claim 9, wherein said collar includes a recess encircling an outer surface thereof and wherein said seal member is positioned in said recess.

11. The electrical assembly of claim 5, wherein said collar has an outer end having at least one screw-receiving aperture and said assembly further comprises a screw received in said screw-receiving aperture to couple said housing assembly to said adapter.

12. The electrical assembly of claim 5, wherein said collar has a symmetrical cross-sectional shape and said passageway in said housing assembly has a symmetrical cross-sectional shape whereby said collar can be inserted into said passageway in different angular orientations with respect to said housing assembly.

13. An electrical box assembly comprising:
an adapter having a base with a dimension for coupling to an electrical box, and a collar extending from said base, said adapter further having a wiring access opening, and
a housing assembly having an internal cavity for supporting an electrical device, said housing assembly having a wall with a passageway dimensioned to receive said collar for coupling said housing assembly to said adapter.

14. The electrical assembly of claim 13, wherein said collar extends from said base in a direction substantially perpendicular to a plane of said base a distance sufficient to mate with said passageway in said wall of said housing assembly.

15. The electrical assembly of claim 13, wherein said collar has a non-circular, symmetrical cross-section.

16. The electrical assembly of claim 13, wherein said collar has an outer end and an axial dimension, said collar having an axial passage defining said wiring access opening, and wherein said outer end includes an aperture for receiving a fastener for coupling said housing assembly to said adapter.

17. The electrical assembly of claim 13, wherein said collar has a non-circular shape to resist rotation of said collar within said passageway in said wall of said housing assembly, and wherein said collar can be received in said passageway in a first angular position and in a second angular position with respect to said housing assembly.

18. The electrical assembly of claim 17, wherein said second angular position is oriented at about 90° with respect to said first angular position.

19. The electrical assembly of claim 13, wherein said collar of said adapter is slidably received in said passageway in said wall of said housing assembly.

20. The electrical assembly of claim 13, further comprising a seal member between said adapter and said housing assembly.

21. The electrical assembly of claim 13, further comprising a seal member on said collar for forming a seal between said collar and said housing assembly.

22. The electrical assembly of claim 21, wherein said collar has an outer surface with a recess encircling said collar and wherein said seal member is positioned in said recess.

23. The electrical assembly of claim 13, wherein said housing assembly comprises a guide member adjacent said passageway for guiding said collar.

24. The electrical assembly of claim 23, wherein said guide member comprises a guide sleeve adjacent said passageway for cooperating with said collar.

25. The electrical assembly of claim 24, wherein said guide sleeve has an axial passage defining said passageway in said housing assembly, wherein said guide sleeve has an internal dimension complementing an outer dimension of said collar.

26. The electrical assembly of claim 25, wherein said guide sleeve extends inwardly into said housing assembly in a direction substantially perpendicular to said wall.

27. The electrical assembly of claim 25, wherein said collar has an inner surface and an outer surface, and wherein said housing assembly includes a guide plate oriented with respect to said guide sleeve of said housing assembly to extend into said axial passage of said collar.

28. The electrical assembly of claim 27, wherein said guide plate is substantially parallel to said guide sleeve.

29. The electrical assembly of claim 28, wherein said guide plate has a free end facing in an axial direction with respect to said guide sleeve toward said wall of said housing assembly.

30. The electrical assembly of claim 13, wherein said housing assembly comprises a guide member adjacent said passageway in said wall of said housing assembly and positioned for guiding an outer surface of said collar, and a guide plate oriented to guide an inner surface of said collar through said passageway in said wall of said housing assembly.

31. The electrical assembly of claim 13, wherein said housing assembly comprises a housing having a bottom wall and a faceplate coupled to said housing defining said housing assembly, said passageway in said housing assembly being provided in said bottom wall, and further comprising a fastener aligned with said passageway for coupling with said collar of said adapter to couple said housing assembly to said adapter.

32. The electrical assembly of claim 31, wherein said collar has an outer end with an aperture, and wherein said fastener is a screw received in said aperture for coupling said housing assembly to said adapter.

33. The electrical assembly of claim 32, wherein said faceplate includes an aperture and wherein said screw extends through said aperture in said faceplate for coupling said housing assembly to said adapter.

34. The electrical assembly of claim 31, wherein said faceplate is removably coupled to said housing.

35. The electrical assembly of claim 13, said housing assembly having a bottom wall with said passageway formed therein and a guide sleeve surrounding said passageway and extending in a direction substantially perpendicular to said bottom wall and having an internal dimension complementing an outer dimension of said collar whereby said collar is received in said guide sleeve, said housing assembly further comprising a front wall having an aperture, and a fastener extending through said aperture and coupled to said collar.

36. The electrical assembly of claim 13, said housing assembly further comprising a removable bottom wall closing said passageway in said housing.

37. The electrical assembly of claim 36, wherein said bottom wall is removably coupled to said housing assembly by frangible lines.

38. An electrical assembly comprising:
a housing having a rear wall, at least one side wall and an open front side, said rear wall having a guide sleeve extending substantially perpendicular to said rear wall and extending toward said open front side, said guide sleeve having a bottom end and an open front end, and a removable bottom wall coupled to an inner surface of said guide sleeve by a frangible line to close said bottom end of said guide sleeve, said bottom wall being removable to form an open passageway through said guide sleeve;
at least one electrical device mounted in said housing; and a face plate coupled to said housing to close said open front end, said face plate having at least one opening to access said electrical device.

39. The electrical assembly of claim 38, further comprising an adapter for coupling to an electrical box, said adapter having a collar with an axial passage having a dimension to feed electrical wiring from said electrical box through said axial passage, and wherein said collar has a length and width to be received within said open passageway of said sleeve by removing said bottom wall.

40. The electrical assembly of claim 39, wherein said faceplate includes an aperture aligned with said removable wall for receiving a fastener for coupling said housing to said adapter.

* * * * *